United States Patent Office 3,205,071
Patented Sept. 7, 1965

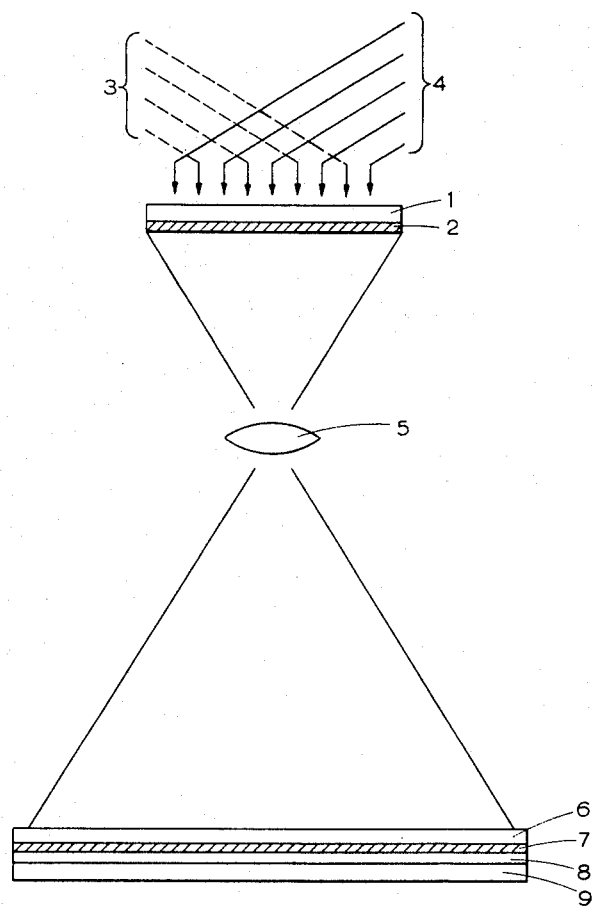

3,205,071
METHOD AND APPARATUS FOR COPYING
REPRESENTATIONS
Ronald Tavenor Finnis, Hayes, England, assignor to Electric & Musical Industries Limited, Hayes, England, a company of Great Britain
Filed Jan. 5, 1959, Ser. No. 785,043
Claims priority, application Great Britain, Jan. 9, 1958, 880/58
17 Claims. (Cl. 96—27)

This invention relates to methods of copying representations.

It is well known that when customary methods of printing negative photographic transparencies are employed the print often suffers from a considerable loss of detail. To overcome the problem of excessive contrast range and tonal compression in photographic printing, various methods have been proposed including the use of manual shading or so-called "dodging" by the use of graded filters, sharp or unsharp masks and the like. These methods, however, are only partially effective and moreover are slow and expensive in operation and call for individual attention by skilled operators. It has also been proposed to increase the detail in a photographic print by scanning the negative with a light spot and modulating the intensity of the spot in accordance with the density of small areas of the negative and to expose the sensitive surface to the modulated light spot. In this manner it can be arranged that the intensity of light to which small areas of the sensitive surface are exposed is so varied in relation to the average density of the elemental parts of the areas of the negative that an increase in the detail of the print results. Such an arrangement is disclosed in "Photographic Engineering" volume 5, 1954, page 219 and in "British Communications and Electronics" for December 1955, page 50. This last mentioned method is satisfactory in the sense that it results in the production of prints with very much increased detail contrast but the equipment required for its use is complex and expensive.

The object of the present invention is to provide an improved method of copying representations by means of which copies can be made rapidly with increased detail contrast and which involves the use of less expensive equipment compared with the last method referred to above.

According to the invention there is provided a method of copying representations comprising directing onto a luminescent screen via a representation to be copied, radiation capable of exciting said screen so as to form a pattern of light on said screen substantially corresponding to the representation to be copied and directing via the representation to be copied and onto said screen radiation which modifies said pattern of light which would otherwise be formed on said screen so that the intensity of bright parts of said pattern of light are reduced compared with dark parts of said pattern and exposing a sensitive surface to the modified pattern of light.

The radiation may be reflected from the representation although it is preferred to direct the radiation through the representation. The screen may be one composed of a fluorescent material which can be excited by for example the use of ultra-violet light and the excitation quenched by infra-red rays. The invention is particularly applicable to printing from photographic negatives and the pattern of light which is set up on said screen may correspond to that penetrating the combined negative and sharp (or unsharp) mask such as have been employed in photographic printing methods.

In order that the said invention may be clearly understood and readily carried into effect, it will now be more fully described with reference to the accompanying drawing which diagrammatically illustrates apparatus suitable for carrying the method of the invention into effect.

The invention will be described as applied to apparatus suitable for making positive prints from photographic negatives. As shown in the drawing the reference numeral 1 indicates a transparent support carrying a photographic emulsion 2, the support 1 and emulsion 2 forming a photographic negative. Obviously the support 1 may be glass or a film. The negative is supported in the position shown in any suitable manner and the negative is arranged to be irradiated from two sources of radiation indicated respectively diagrammatically at 3 and 4. Radiation passes through the photographic negative and a lens 5 projects an image of the negative which may either be enlarged, reduced or the same size as the negative, on to a plate 6 which is transparent to the radiation from the sources 3 and 4, the plate 6 carrying a screen 7 onto its surface remote from the lens 5 the screen 7 being capable of being rendered luminescent. The screen 7 should, of course, be of a fine grain structure and should preferably be thin in order to obtain good resolution. The screen produces a pattern of light corresponding to negative representations to be printed as a result of irradiation by one of said sources and this pattern of light is modified by the radiation from the other source so that the intensity of the bright parts of the pattern which would otherwise be produced are reduced compared with the dark parts so as to increase the detail and reduce the contrast in a print reproduced from the negative. The print may be formed on a material such as bromide paper 9 which is placed in close proximity to the screen 7, there being provided if desired on the surface of screen 7 a thin protective covering 8 transparent to the visible light produced on the screen 7.

The screen 7 may be one composed of a fluorescent material such as one of the zinc sulphide type such as zinc sulphide and cobalt nickel or iron, activated by copper or silver. Such a screen can be excited to luminesce by ultra-violet light and the luminescence quenched by infra-red rays. Thus when such a screen is employed in the present invention, the source 3 may be any suitable source of ultra-violet radiation such as a mercury vapour lamp and the source 4 any suitable source of infra-red radiation such as an infra-red lamp. When ultra-violet light is projected through the negative onto the screen 7 the latter is caused to fluoresce and produce a pattern of light corresponding to the negative, and when the screen 7 is irradiated with infra-red rays the fluorescence of the screen is quenched dependent on the amount of infra-red radiation passed by the negative and reaching the screen 7. Dense parts of the negative will pass less infra-red radiation compared with less dense parts so that the bright parts of the pattern of light will be quenched to a greater degree than the less bright parts. The sensitive surface 9 is exposed to the pattern of light formed on the screen 7. The intensity of the radiation projected onto the negative should preferably be variable and any suitable means may therefore be provided for varying the intensity of the radiation from said sources. Any suitable form of holder may be provided for the sensitive surface 9 such as a suitable frame which may be hinged at one side and attached to a supporting base.

With the apparatus shown in the drawing the ultra-violet source 3 may first be energised and the lens 5 adjusted so that the visible fluorescent image produced on the screen 7 is sharply rendered. The ultra-violet source may then be extinguished or the lens 5 may be capped and the light sensitive surface 9 is then disposed into proximity to the screen 7. If the ultra-violet source is again energised and allowed to irradiate the screen 7, the sensitive surface 9 will be exposed to the visible image created thereon which, if developed, would produce a normal positive photographic print. The source of infra-red rays is however simultaneously previously or subsequently excited with the result that in the less dense parts of the negative more infra-red rays will be transmitted which due to the quenching action of these rays on the screen 7 will limit the brightness of the corresponding portion of the screen 7. Thus the contrast of the fluorescent image formed on the screen 7 will be reduced and so will be the contrast in the resulting print formed on the surface 9 which is ultimately exposed to the modified pattern of light.

If the infra-red image of the negative is as sharp as the ultra-violet image the general result will be similar to that known as "sharp masking" and there will be a proportionate reduction of all contrasts in the print obtained from the negative. The lens 5 may, of course, be designed so as to produce sharp images of both the infra-red and ultra-violet radiation. However, the lens 5 may be a typical enlarging anastigmatic lens and such a lens will not simultaneously focus sharply both ultra-violet and infra-red radiation. If the position of the lens 5 is adjusted so that the ultra-violet radiation is in sharp focus, the infra-red radiation will be noticeably out of focus on the fluorescent screen 7 with the result that the effect produced on the print will be similar to "unsharp masking." In other words, there will be a reduction in gross contrast whilst detail contrast is maintained. Detail contrast may even be enhanced due to using the steep middle portion of the characteristic curve of the sensitive surface 9. The sensitive surface may be even more contrasty than conventional bromide paper so that a further gain in detail contrast may be obtained. By varying the intensity of the infra-red radiation with respect to the ultra-violet radiation the degree of quenching can be altered and thereby the gross contrast of the print can be modified as required.

The wavelengths of the radiation employed for the fluorescent material aforesaid are usually in the region of 3600–4000 A. for ultra-violet light and 8000 A. for infra-red radiation. Enlarging lenses made for normal photographic purposes transmit these wavelengths without undue loss and therefore may be employed in the present invention. If a lens is required which transmits a greater proportion of the ultra-violet radiation then a lens made of quartz may be required. Obviously the lens employed may be designed so as to have different refractive properties for the ultra-violet and infra-red radiation so as to further enhance the "unsharp masking" effect.

The screen 7 should preferably convert all of the incident ultra-violet radiation into visible light since any ultra-violet light transmitted by the screen 7 may act directly upon the sensitive surface 9. This may restrict the degree of contrast control obtainable. If desired therefore a thin layer of material capable of absorbing ultra-violet light may be provided on the surface of the screen 7 remote from the lens 5 and such layer may form the aforementioned protective layer 8. Obviously if desired the sensitive surface 9 may not be disposed in such proximity to the screen 7 as to print by contact since if desired a further lens may be provided for focussing the image formed on the screen 7 onto a sensitive surface disposed remote therefrom. Moreover if desired the lens 5 may be omitted and the negative may be disposed in contact with the support 6.

What I claim is:

1. A method of copying representations comprising directing radiation onto a representation to be copied, transmitting said radiation from said representation to produce an image on a fluorescent screen, said radiation being capable of exciting said screen to luminescence so as to form a pattern of actinic light on said screen corresponding to the representation to be copied, directing a different radiation onto said representation to be copied, transmitting said different radiation from said representation onto said fluorescent screen so as to produce an image of said representation in said different radiation on said screen, said different radiation being capable of reducing the intensity of the bright parts of said pattern of actinic light compared with the dark parts thereof so as to modify the pattern of actinic light which would otherwise be produced and exposing a photo-sensitive surface to said modified pattern of actinic light.

2. A method according to claim 1 wherein said radiation is ultra-violet light and said luminescent screen is capable of being rendered luminescent by said ultra-violet light and said different radiation is infra-red radiation capable of quenching the luminescence produced by said ultra-violet light.

3. A method according to claim 1 wherein the image in one of said radiation and said different radiation is out of focus on said screen and the image in the other of said radiation and said different radiation is focussed on said screen.

4. A method of copying a photographic transparency comprising directing radiation onto said transparency, transmitting said radiation through said transparency to produce an image on a fluorescent screen, said radiation being capable of exciting said screen to luminescence so as to form a pattern of actinic light on said screen corresponding to said transparency, directing a different radiation onto said transparency, transmitting said different radiation through said transparency to produce an image on said fluorescent screen, said different radiation being capable of reducing the intensity of the bright parts of said pattern of actinic light compared with the dark parts thereof so as to modify the pattern of actinic light which would otherwise be produced and exposing a photo-sensitive surface to said modified pattern of actinic light.

5. A method according to claim 4 wherein said radiation is ultra-violet light and said luminescent screen is capable of being rendered luminescent by said ultra-violet light and said different radiation is infra-red radiation capable of quenching the luminescence produced by said ultra-violet light.

6. A method according to claim 4 wherein the image in one of said radiation and said different radiation is out of focus on said screen and the image in the other of said radiation and said different radiation is focused on said screen.

7. Apparatus for copying representations comprising means for supporting a representation to be copied, a source of radiation disposed to direct radiation onto a representation carried by said support, a luminescent screen mounted to receive an image of said representation in said radiation from said representation, said radiation being capable of exciting said screen to luminesce so that a pattern of actinic light is set up on said screen corresponding to the representation to be copied, a different source of radiation disposed to direct radiation onto said representation carried by said support, said luminescent screen receiving an image of said representation in said different radiation from said representation, said different radiation being capable of reducing the intensity of bright parts of said pattern of actinic light compared with the dark parts thereof so as to modify the pattern of actinic light which would otherwise be produced and means for supporting a photo-sensitive surface for exposure to said modified pattern of actinic light.

8. Apparatus according to claim 7 wherein said screen is one capable of being excited by ultra-violet light and in which the luminescence of said screen is capable of being quenched by infra red rays and wherein said source of radiation comprises a source of ultra-violet light and said different source of radiation comprises a source of infra red rays.

9. Apparatus according to claim 7 wherein said screen is composed of zinc sulphide and a metal selected from the group consisting of cobalt, nickel and iron and is activated by a metal selected from the group consisting of copper and silver.

10. Apparatus according to claim 7 including a lens disposed between said means for supporting the representation to be copied and said screen.

11. Apparatus according to claim 8 wherein on the side of said screen remote from said source of radiation and said different source of radiation a surface is provided capable of absorbing ultra-violet radiation.

12. Apparatus for copying transparencies comprising means for supporting a transparency to be copied, a source of radiation disposed to direct radiation through said transparency, a luminescent screen mounted to receive an image of said transparency in said radiation from said transparency, said radiation being capable of exciting said screen to luminesce so that a pattern of actinic light is set up on said screen corresponding to said transparency, a different source of radiation disposed to direct radiation onto said transparency and through said transparency to produce an image of said transparency onto said luminescent screen, said different radiation being capable of reducing the intensity of the bright parts of said pattern of actinic light compared with the dark parts thereof so as to modify the pattern of actinic light which would otherwise be produced and means for supporting a photo-sensitive surface for exposure to said modified pattern of actinic light.

13. Apparatus according to claim 12 wherein said screen is one capable of being excited by ultra-violet light and in which the luminescence of said screen is capable of being quenched by infra-red rays and wherein said source of radiation comprises a source of ultra-violet light and said different source of radiation comprises a source of infra-red rays.

14. Apparatus according to claim 12 wherein said screen is composed of zinc sulphide and a metal selected from the group consisting of cobalt, nickel and iron and is activated by a metal selected from the group consisting of copper and silver.

15. Apparatus according to claim 12 including a lens disposed between said means for supporting the transparency to be copied and said screen.

16. Apparatus according to claim 13 wherein on the side of said screen remote from said source of radiation and said different source of radiation a surface is provided capable of absorbing ultra-violet radiation.

17. A method of copying a representation comprising transmitting a first radiation lying within the ultra-violet portion of the electromagnetic spectrum from a representation to be copied onto a luminescent material to produce a pattern of actinic radiation on said material corresponding to said representation; modifying said pattern by transmitting a second radiation of longer wavelength than said first radiation from said representation onto said luminescent material and directing the modified pattern onto a photosensitive surface; said luminescent material exhibiting luminescence upon exposure to that part of said spectrum of said first radiation, which luminescence is quenched upon exposure to the wavelengths of said second radiation.

References Cited by the Examiner

UNITED STATES PATENTS

| | | | |
|---|---|---|---|
| 1,966,322 | 7/34 | Tuttle. | |
| 2,482,813 | 9/49 | Urbach | 96—27 X |
| 2,642,538 | 6/53 | Urbach | 250—80 X |

NORMAN G. TORCHIN, *Primary Examiner.*

MILTON STERMAN, PHILIP E. MANGAN, HAROLD N. BURSTEIN, A. LOUIS MONACELL, *Examiners.*